Oct. 30, 1962           A. PEARLMAN           3,061,359
VEHICLE WITH HEIGHT-ADJUSTABLE TOP FOR VARYING CARGO SPACE
Filed Jan. 30, 1961                           2 Sheets-Sheet 1
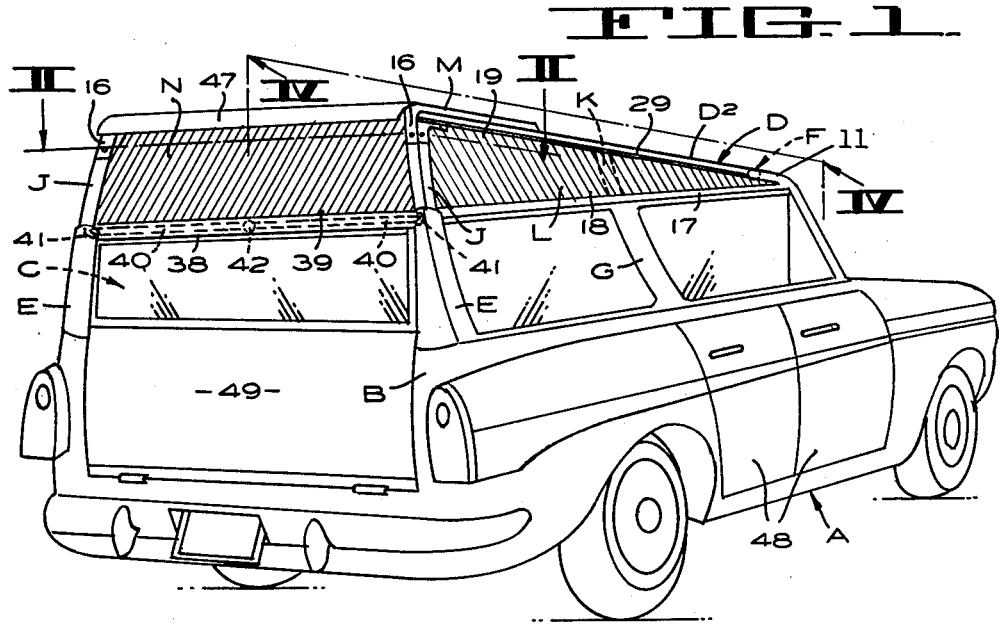
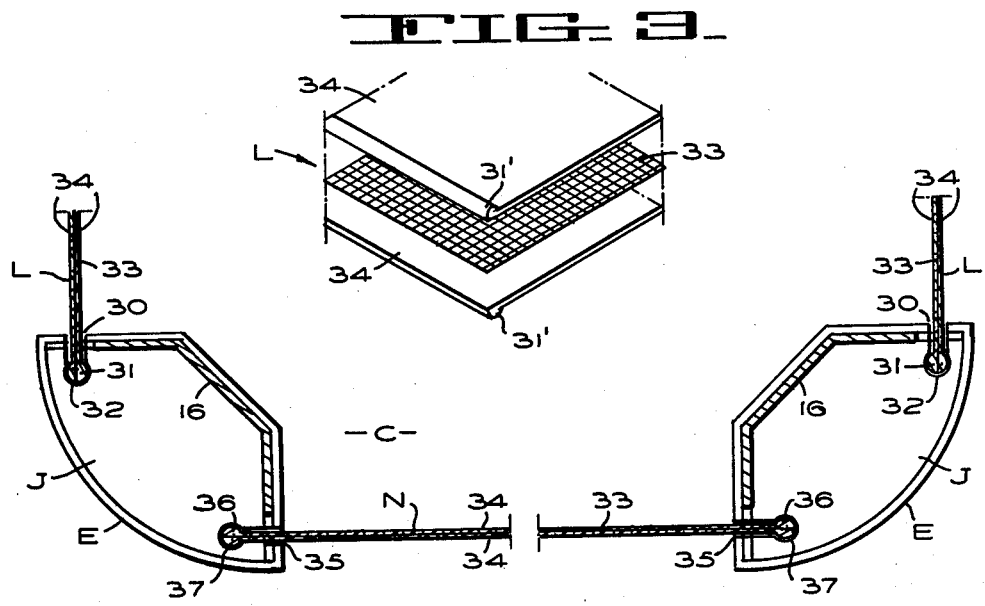
INVENTOR.
ALBERT PEARLMAN
BY
Munn & Liddy
ATTORNEYS Oct. 30, 1962　　　A. PEARLMAN　　　3,061,359
VEHICLE WITH HEIGHT-ADJUSTABLE TOP FOR VARYING CARGO SPACE
Filed Jan. 30, 1961　　　2 Sheets-Sheet 2
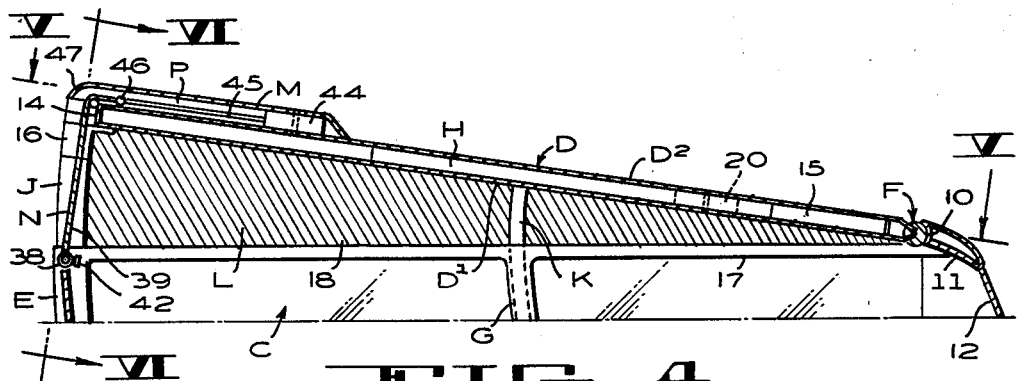
FIG. 4.
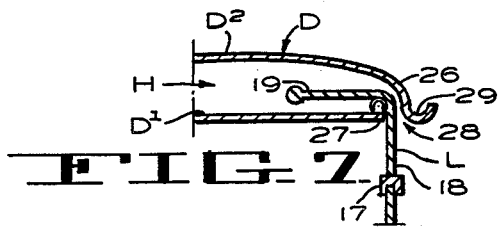
FIG. 7.
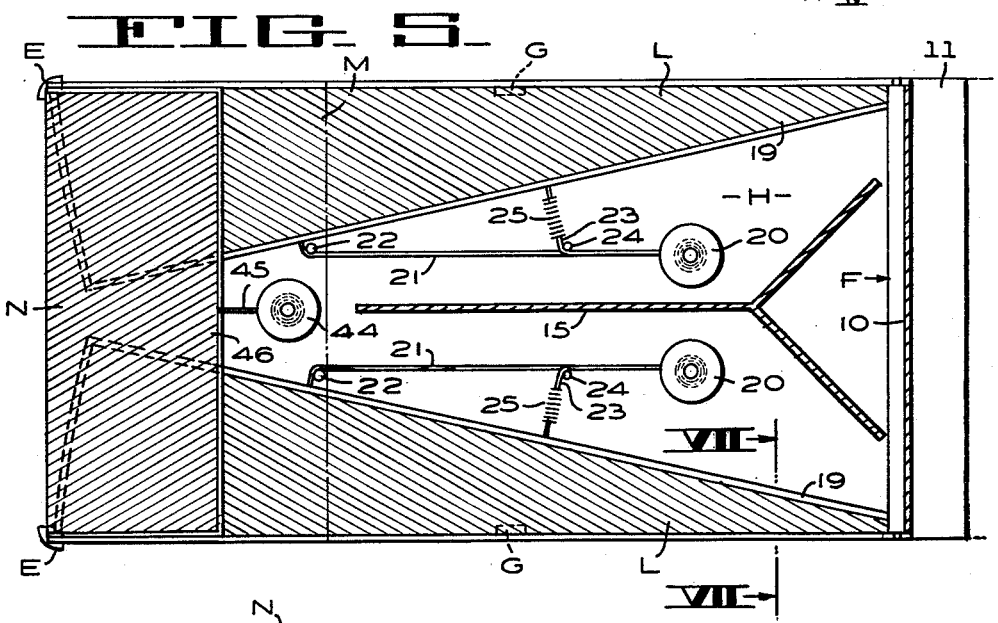
FIG. 5.
FIG. 6.
INVENTOR.
ALBERT PEARLMAN
BY Munn & Liddy
ATTORNEYS United States Patent Office 3,061,359
Patented Oct. 30, 1962

3,061,359
VEHICLE WITH HEIGHT-ADJUSTABLE TOP FOR
VARYING CARGO SPACE
Albert Pearlman, 2470 30th Ave., San Francisco, Calif.
Filed Jan. 30, 1961, Ser. No. 85,850
7 Claims. (Cl. 296—26)

It is proposed in this invention to provide a convertible vehicle in which the top may be raised relative to the body so as to afford adequate headroom and to increase the cargo capacity. Moreover, the top may be lowered, especially when the additional height of the cargo space is not required. In either event, the total unit is almost invisible, when not in use, and yet is harmonious in appearance to the vehicle when in use.

An object of my invention is to provide certain improvements in a vehicle with height-adjustable top for varying cargo space. It is proposed to provide flaps which are movable into a position to automatically form closures for the gaps between the top and the vehicle body, when the top is elevated, these flaps being movable automatically into the confines of the top, when the latter is lowered. For this purpose, the top is made with upper and lower roofs which define a space therebetween. The flaps may be retracted into this space, when the top is lowered, and extended therefrom upon raising the top.

Other objects and advantages will appear as the specification continues. The novel features of the invention will be pointed out in the appended claims.

For a better understanding of the invention, reference should be had to the accompanying drawings, forming part of this specification, in which:

FIGURE 1 is perspective view of a vehicle provided with my improved height-adjustable top;

FIGURE 2 is a fragmentary horizontal sectional view taken along the plane II—II of FIGURE 1, this view being shown on an enlarged scale;

FIGURE 3 is an exploded isometric view disclosing the flexible steel mesh and rubber coverings forming the flap material;

FIGURE 4 is a longitudinal sectional view taken along the medial plane IV—IV of FIGURE 1, with the top raised;

FIGURE 5 is a horizontal sectional view taken along the plane V—V of FIGURE 4, but with the top lowered;

FIGURE 6 is a rear elevational view, as seen from the plane VI—VI of FIGURE 4; and FIGURE 7 is an enlarged sectional view taken along the plane VII—VII of FIGURE 5.

While I have shown only the preferred form of my invention, it should be understood that various changes, or modifications, may be made within the scope of the annexed claims without departing from the spirit thereof.

*Detailed Description*

Referring to the drawings in detail, the vehicle A has been illustrated as being a station wagon having a body B, the latter defining a cargo space C on the interior thereof. Of course, I do not wish to be limited to any particular type of vehicle. The top for the vehicle has been designated generally by the reference character D, and its structural features will be set forth in detail as the specification continues.

It will be noted that the body B is fashioned with a pair of tubular outer column posts E of the shape shown in FIGURE 2, these column posts being curved on a radius whose center coincides with the axis of a horizontally disposed socket-roller hinge F disposed at the front of the top D. The top is swingable about this hinge when the top is raised and lowered. Moreover, the body B has a pair of intermediate tubular outer posts G, which likewise are curved on a radius about the axis of the socket-roller hinge F.

With respect to the top D, it defines a lower roof $D^1$ and an upper roof $D^2$ (see FIGURE 4), these roofs being separated one from the other to define a space H therebetween. Both roofs are secured at their leading ends to the socket-roller hinge F, and the latter is rotatably supported against a curved edge 10 of a stationary front section 11 of the vehicle top to which the windshield 12 is attached. The roofs $D^1$ and $D^2$ may be interconnected by a spacer 14 at their trailing ends (see FIGURE 4). Aslo, a Y-shaped spacer 15 may be interposed between these roofs (see FIGURE 5), thus maintaining them in spaced relation.

As shown in FIGURES 1, 2, 4 and 6, a rear pair of curved inner posts J are slidably disposed in the stationary outer column posts E, the posts J being secured by brackets 16 to the top D. Likewise, a pair of intermediate curved inner posts K are slidably disposed in the stationary outer posts G. The posts J and K are curved on radii whose centers coincide with the axis of the socket-roller hinge F.

Turning now to FIGURES 1, 4 and 7, it will be apparent that the vehicle body B is provided with top rails 17 extending longitudinally thereof along opposite sides of this body. In order to provide closures for the gaps that are formed between the top rails 17 and the top D, when the latter is raised as in FIGURES 1 and 4, I have provided a pair of flexible side flaps L. These flaps have their bottom edges 18 secured to the top rails 17, while their upper edges 19 extend into the space H between the roofs $D^1$ and $D^2$ (see FIGURES 4, 5 and 7). The flaps L conceal the intermediate posts K from exterior view.

When the top D is swung into a raised inclined position, as shown in FIGURES 1 and 4, the side flaps L will be extended automatically from the space H, inasmuch as their bottom edges 18 are attached to the top rails 17. This will afford closures for the gaps between the top rails and the raised top. However, when the top D is lowered, spring reels 20 will draw the side flaps L into the space H between the roofs $D^1$ and $D^2$ (see FIGURE 5). Each of these spring reels is provided with a pair of cords, the first cord 21 being trained over a pulley 22 and being attached to a rear section of one of the side flaps L at an upper edge 19 of the latter. The second cord 23 of each reel 20 passes over a pulley 24 and is attached to an intermediate section of one of the side flaps L at an upper edge 19. Each of the second cords is provided with a tension spring 25 therein.

It will be apparent from FIGURE 7 that the upper roof $D^2$ may have its lateral edges 26 curved downwardly over the lateral edges 27 of the lower roof $D^1$, but spaced therefrom so as to form passageways 28 through which the side flaps L may extend. Moreover, a drain gutter 29 may extend along the lateral edges 26 of the upper roof $D^2$. This arrangement will afford a weather-proof construction along the opposite lateral sides of the top. Both lateral sides of the top D are identical with that shown in FIGURE 7.

Reference is made to FIGURE 2, wherein it will be observed that the side flaps L project through vertical slots 30 formed in the outer column posts E. These side flaps have beads 31 that extend into and are anchored in keyhole slots 32 formed in the travelling inner posts J.

The construction of the flexible side flaps L is disclosed in the exploded view illustrated in FIGURE 3. Here it will be observed that a flexible steel mesh 33 is interposed between two sheets of rubber 34. Each sheet of rubber has a semicircular bead portion 31', which coact to provide the bead 31, when the rubber sheets 34 are bonded together. The embedded steel mesh 33 will make the side flaps L substantially burglar proof, thereby protecting the cargo carried by the vehicle.

It will be noted from FIGURES 1 and 4 that a dome M is fixed to the rear section of the upper roof $D^2$ so as to be spaced thereabove. A rear flap N is adapted to be accommodated in the space P between the dome M and the upper roof $D^2$, when the top D is lowered. The sides of this rear flap extend through vertical slots 35 in the outer column posts E, and the rear flap N has beads 36 that extend along its sides and project into keyhole slots 37 formed in the inner posts J. The rear flap N may be made of the same construction as the side flaps L, i.e., it has a flexible steel mesh 33 embedded between a pair of rubber sheets 34.

As illustrated in FIGURES 1, 4 and 6, the rear flap N has a tubular sleeve 38 attached to its outer end 39, and detents 40 are carried by this sleeve so as to engage in notches 41 formed in the stationary outer column posts E. With particular reference to FIGURE 6, it will be seen that an operating knob 42 on the inside of the flap N has a cam 43 fixed thereto so as to urge the detents 40 into the notches 41, when this knob is turned in one direction. Upon turning the knob in the opposite direction, the detents 40 may be released from the notches 41. Any suitable means may be used for actuating these detents.

In FIGURES 4 and 5, I have shown a spring reel 44 having a cord 45 extending therefrom, this cord being attached to the inner end 46 of the rear flap N. Assuming that the detents 40 are engaged with the notches 41, it will be apparent that the rear flap N will be extended from the space P, when the top D is elevated. However, when this top is lowered, the spring reel 44 will retract the upper part of the rear flap N into the space P below the dome M.

The dome M may be provided with a downwardly curved cowl 47 at its back to prevent rain and the like from entering the space P (see FIGURES 1 and 4). The rear ends of the drain gutters 29 preferably extend underneath this cowl.

It will be appreciated that the foregoing construction is such that when the top D is raised by hydraulic, or other suitable means, the flaps L and N will be extended automatically into the positions shown in FIGURE 1. However, upon lowering the top D, the flaps L and N will be retracted automatically into the spaces H and P, respectively.

Of course, the height-adjustable top D may be opened any portion of its maximum increasable height with equal efficiency. In its varying degrees of open use, the wedge shape of the top offers an ideal contour aerodynamically to permit the vehicle A to ride well and hold to the road. Moreover, the clam-shell action of the top, from front to rear, adds the greatest degree of height in the rear where it is most needed for insertion of bulky objects.

It will be apparent that the doors 48 and other moving portions of the vehicle A are not affected by the use of my height-adjustable top D, and may be permitted to operate in their normal manner. Rigidity of normal structure is not weakened by the use of nor the insertion of my device.

The construction of the flaps L and N are of a multiple layer of elements, the steel mesh 33 being for the purpose of reinforcing the rubber sheets 34. As previously mentioned, these layers are bonded together, the flaps L and N having ferrule edges or beads 31 and 36, respectively. These flaps become as burglar-proof as any other portion of the vehicle.

The rear flaps N may be locked or unlocked from the interior of the vehicle by actuating the knob 42. The tail gate or rear door 49 operates in the normal manner. The rear flap N may be opened or closed independently of all other portions to the full extent to which it is in operation. The height-adjustable top D is weather-proof at all points in any position.

Novel utilization of the double roof $D^1$—$D^2$, plus the end dome M, contains and conceals the closure flaps and operating mechanism. These items cannot be tampered with, nor can they be of any harm. The independent self-operating spring reels 20—20 and 44 contained in the top structure continuously apply and release tension automatically as needed to each flap for proper operation. The spacer 15 between the roofs $D^1$ and $D^2$ give needed rigidity and strength to the top D. The entire device can be serviced with a minimum of labor.

The keyhole slots 32 and the beads 31 on the side flaps L, as well as the keyhole slots 37 and the beads 36 on the rear flap N, serve to prevent rain and wind from gaining access to the interior of the vehicle. The mesh 33 may be made from any suitable mesh. The maximum height to which the rear end of the top F may be raised is 45% of the width of the top.

I claim:

1. In a vehicle with a height-adjustable top for varying cargo space: a vehicle body having horizontal top rails extending lengthwise thereof along opposite lateral sides of the vehicle body; the vehicle body being provided with a stationary front top section; a top disposed above the top rails and extending rearwardly from said top section; means swingably securing the leading end of the top against said top section, whereby the top may be raised and lowered into different inclined positions relative to the top rails; the top having lower and upper roofs providing a space therebetween; a pair of triangularly-shaped flexible side flaps, each having a bottom edge attached to one of the top rails; each side flap having an upper edge extending into the space between the roofs; and yielding means connected to the upper edges of the side flaps, and being operable to automatically draw the side flaps into the space between the roofs, when the top is lowered, and being yieldable to automatically allow the side flaps to extend from the top so as to close the gaps between the top rails and the top, when the latter is raised.

2. The vehicle with a height-adjustable top, as set forth in claim 1; and in which the upper roof is provided with lateral edges that extend downwardly over adjacent lateral edges of the lower roof; the lateral edges of the upper and lower roofs defining passageways through which the side flaps extend.

3. The vehicle with a height-adjustable top, as set forth in claim 1; and in which the means swingably securing the leading end of the top against said top section defines a horizontally disposed socket-roller hinge; the vehicle body being provided with tubular outer column posts; the top having inner posts secured thereto which are slidably disposed in the outer column posts of the vehicle body; the outer and inner posts being curved about the horizontal axis of the socket-roller hinge.

4. The vehicle with a height-adjustable top, as set forth in claim 3; and in which the tubular outer columns have vertical slots through which marginal sections of the side flaps extend; the side flaps being formed with beads which are slidably secured in vertically-extending keyhole slots formed in the slidable inner posts.

5. In a vehicle with a height-adjustable top for varying cargo space: a vehicle body; a top having a leading end swingably secured to the vehicle body, whereby a trailing end of the top may be raised and lowered; a dome secured to a back portion of the top and providing a space therebetween; a flexible rear flap having an inner end extending into the space between the dome and the top; the rear flap having an outer end; means operable to removably anchor the outer end of the rear flap to the vehicle body; and yielding means connected to the inner end of the rear flap and being operable to automatically draw the rear flap into the space between the dome and the top, when the top is lowered, and being yieldable to automatically allow the rear flap to extend from the top, when the latter is raised.

6. The vehicle with a height-adjustable top, as set forth in claim 5; and in which the vehicle body is provided with tubular outer column posts; the top having inner posts secured thereto which are slidably disposed in the outer column posts of the vehicle body; the tubular outer columns having vertical slots through which marginal sections of the rear flap extend; the rear flap being formed with beads which are slidably secured in vertically-extending keyhole slots formed in the slidable inner posts.

7. In a vehicle with a height-adjustable top for varying cargo space: a vehicle body having horizontal top rails extending lengthwise thereof along opposite lateral sides of the vehicle body; the vehicle body being provided with a stationary front top section; a top disposed above the top rails and extending rearwardly from said top section; means swingably securing the leading end of the top against said top section, whereby the top may be raised and lowered into different inclined positions relative to the top rails; the top having lower and upper roofs providing a space therebetween; a pair of triangularly-shaped flexible side flaps, each having a bottom edge attached to one of the top rails; each side flap having an upper edge extending into the space between the roofs; and yielding means connected to the upper edges of the triangular side flaps and comprising a spring reel for each flap; a first cord for each flap having one end secured to the upper edge of the flap, the connection being spaced a short distance from the rear edge of the flap; a pulley for each of said first cords for causing the cord to pull substantially at right angles to the upper edge of the flap; the other end of each cord being connected to its spring reel for causing the reel to yieldingly pull on the cord at all times; said yielding means including a second cord for each flap having one end secured to a coil spring and the spring being secured to the upper edge of the flap at a spaced distance from the connection of the first cord with the flap and nearer the front part of the flap; the other end of each second cord being connected to its spring reel; whereby the spring reels will yieldingly pull on the second cords for causing the latter to pull on the upper edges of the flaps; the coil springs compensating for the angular swinging of the upper edges of the flaps as the flaps move into or out of the space between the roofs as the top is swung into different angular positions from its initial closed position.

References Cited in the file of this patent

UNITED STATES PATENTS

| | | |
|---|---|---|
| 1,750,888 | Harrold | Mar. 18, 1930 |
| 2,496,055 | King | Jan. 31, 1950 |
| 2,963,313 | Bennett | Dec. 6, 1960 |

FOREIGN PATENTS

| | | |
|---|---|---|
| 530,648 | Belgium | Oct. 11, 1957 |